United States Patent [19]
Kinney

[11] Patent Number: 5,203,278
[45] Date of Patent: Apr. 20, 1993

[54] TEMPERATURE WARNING DEVICE

[75] Inventor: Richard J. Kinney, Alexandria, Va.

[73] Assignee: Commonwealth Technology Inc., Alexandria, Va.

[21] Appl. No.: 814,792

[22] Filed: Dec. 31, 1991

[51] Int. Cl.$^5$ .................. G01K 1/14; G01K 11/06
[52] U.S. Cl. .................. 116/218; 246/169 A; 411/8
[58] Field of Search .................. 374/208, 160, 155; 246/169 A, DIG. 2; 411/8; 116/DIG. 38, 216, 218

[56] References Cited

U.S. PATENT DOCUMENTS

| | | |
|---|---|---|
| 1,509,110 | 5/1922 | Potter . |
| 3,280,629 | 10/1966 | Kliewer . |
| 3,548,780 | 12/1970 | Kliewer . |
| 4,119,284 | 10/1978 | Belmont ............. 116/DIG. 38 |
| 4,356,790 | 11/1982 | Gee . |
| 4,365,643 | 12/1982 | Masclet et al. . |
| 4,709,654 | 12/1987 | Smith ............. 411/8 X |
| 4,748,931 | 6/1988 | Volk . |
| 4,812,826 | 3/1989 | Kaufman et al. ............. 246/169 A |
| 4,818,119 | 4/1989 | Busch et al. . |
| 5,046,447 | 9/1991 | Steinke et al. ............. 374/144 X |

Primary Examiner—Daniel M. Yasich
Attorney, Agent, or Firm—Larson and Taylor

[57] ABSTRACT

A temperature warning device for indicating when a threshold temperature has been exceeded includes a threaded bolt having a bolt head and a bolt body. The bolt head and bolt body have a longitudinal bore defined by a surrounding surface with the bore having a closed end and an open end at the bolt head. A plunger in the bore has a plunger head and a plunger body terminating at the open end of the bore. A retaining cap is secured in the bore of the bolt head and has a cap hole through which the plunger body freely extends. A sleeve of a fusible material is contained in the bore which melts at the threshold temperature. This sleeve substantially fills a volume of the bore radially between the plunger body and the surrounding surface of the bore and longitudinally between the plunger head and the cap. A compressed spring is located in the bore between the closed end and the plunger head. With this construction, if the threshold temperature is exceeded, the fusible sleeve melts and the spring moves the plunger longitudinally so that the plunger body extends beyond the retaining cap and the bolt head and is easily visible to serve as a warning. A two stage signalling is achieved by forming the sleeve of two discrete longitudinal portions butted end to end with a fusible material of the portion adjacent the plunger head having a lower melting temperature than the other the portion.

16 Claims, 1 Drawing Sheet

TEMPERATURE WARNING DEVICE

FIELD OF THE INVENTION

The present invention relates generally to warning devices which signal when a predetermined temperature has been reached, and more particularly to such a warning device which is used in place of an ordinary bolt on an apparatus for a long period of time to determine if the predetermined temperature has been exceeded.

BACKGROUND OF THE INVENTION

A wide variety of devices may be damaged if operation continues at temperatures above ordinary operating temperatures. For example, the rolling bearings on railway cars experience an increased operating temperature as the bearing begins to fail (due to any number of reasons). Due to the large number of such bearings on a train and the harsh environment to which such bearings are exposed, it is difficult to monitor such bearings.

In order to determine if a bearing of a railway car is overheating, there have been disclosed specially adapted bolts which are used in place of one of the normal securing bolts for the end cap of the bearing. Such special bolts react when a predetermined temperature is reached, typically when the temperature of a fusible element of the bolt melts. For example, in U.S. Pat. No. 4,818,119 (Busch et al.), there is disclosed a bolt in which a spring biased pin is ejected from a head of the bolt when a fusible alloy in which the spring is embedded melts. The bolt includes a sealing closure plug which is forcibly removed by the ejecting pin.

Other temperature signalling devices have also been disclosed in the prior art. For example, in U.S. Pat. No. 3,548,780 (Kliewer), a food temperature signalling device is disclosed for signalling when a food article is sufficiently cooked (warmed). In this device, a spring biases a retaining rod toward a fusible plug. The retaining rod moves into the plug when the melting temperature is reached, and this movement releases a signalling staff. Other devices of a similar nature are disclosed in the following U.S. Pat. No. 4,748,931 (Volk), stem head buried in a fusible material; U.S. Pat. No. 4,356,790 (Gee), fusible thin film used as a bonding material; U.S. Pat. No. 3,280,629 (Kliewer), fusible plug; and U.S. Pat. No. 1,509,110 (Potter), fusible links.

Safety devices have also been disclosed in the prior art for protecting against extreme conditions and relieving such conditions when they are experienced. For example, in U.S. Pat. No. 4,365,643 (Masclet et al.), a fuse device for a pneumatic tire is used to vent the pressure in the tire if a certain pressure (which can be related to temperature) is exceeded. In the disclosed device, a central piston blocks escape of the tire pressure, and the tire pressure acts as an upward force on this piston. The piston is prevented from moving by an annular disc of eutectic (fusible) material. When the pressure in the tire exceeds the desired pressure, the eutectic material breaks up and releases the pressure. It will be appreciated that the eutectic material also breaks up more easily at higher temperatures, so that if the tire is heating up as the pressure increases (i.e., because of braking of the tire), the eutectic material breaks up sooner to more quickly prevent the (rising) pressure in the tire from exceeding a desired pressure.

SUMMARY OF THE INVENTION

In accordance with the present invention, a temperature warning device is provided which indicates when a threshold temperature has been exceeded. The warning device includes a base body which is preferably a threaded bolt having a bolt head and a bolt body extending along a longitudinal axis from the bolt head. The bolt head and bolt body have a longitudinal bore defined by a surrounding surface provided along the longitudinal axis with the bore having a closed end and an open end at the bolt head. A plunger in the bore has a plunger head and a plunger body with the plunger body extending from the plunger head and terminating at the open end of the bore. A retaining means which is preferably a retaining cap is secured in the bore of the bolt head and this cap has a cap hole through which the plunger body freely extends. A sleeve of a fusible material is contained in the bore which melts at the threshold temperature. This sleeve substantially fills a volume of the bore radially between the plunger body and the surrounding surface of the bore and longitudinally between the plunger head and the cap. A compressed spring is located in the bore between the closed end and the plunger head. With this construction, if the threshold temperature is exceeded, the fusible sleeve melts and the spring then moves the plunger longitudinally so that the plunger body extends beyond the retaining cap and the bolt head and is easily visible to serve as a warning indicator.

In a preferred embodiment, the plunger head substantially fills the bore radially and includes channels longitudinally therein through which the fusible material of the sleeve passes when melted.

In a second preferred embodiment, a two stage signalling is achieved. In this embodiment, the sleeve is formed of two discrete longitudinal portions butted end to end with a fusible material of the portion adjacent the plunger head having a lower melting temperature than the other portion. Thus, upon reaching the melting temperature of the portion adjacent the plunger head, the spring moves the plunger head into engagement with the other portion and this results in the plunger body extending partially (a first stage) beyond the bolt head. Next, upon reaching the melting temperature of the other portion, the spring moves the plunger head further toward the bolt head and hence the plunger body extends further (a second stage) beyond the bolt head.

In the preferred embodiment, the retaining cap includes a beveled surface at an outermost portion of the cap hole. In addition, there is also provided a first seal means for sealing between the plunger body and the retaining cap while allowing relatively free movement of the plunger body and a second seal means for sealing between the retaining cap and the surrounding surface of the bore.

It is an advantage of the present invention that a reliable warning device is provided to indicate when a threshold temperature has been exceeded.

It is also an advantage of the present invention that a warning indicator (plunger body) can be provided which is deployed in two stages indicating that two temperatures have been exceeded.

It is a further advantage of the present invention that the indicator is easily seen.

Still another advantage of the present invention is that the warning device can not be reset, either accidentally or on purpose, so that it continues to serve as a warning once it has triggered.

Yet another advantage of the present invention is that it scan be employed for long periods of time in hostile environments and still be reliable.

Other features and advantages of the present invention are stated in or apparent from detailed descriptions of presently preferred embodiments of the invention found hereinbelow.

DETAILED DESCRIPTION OF THE PREFERRED EMBODIMENTS

Figure 1:
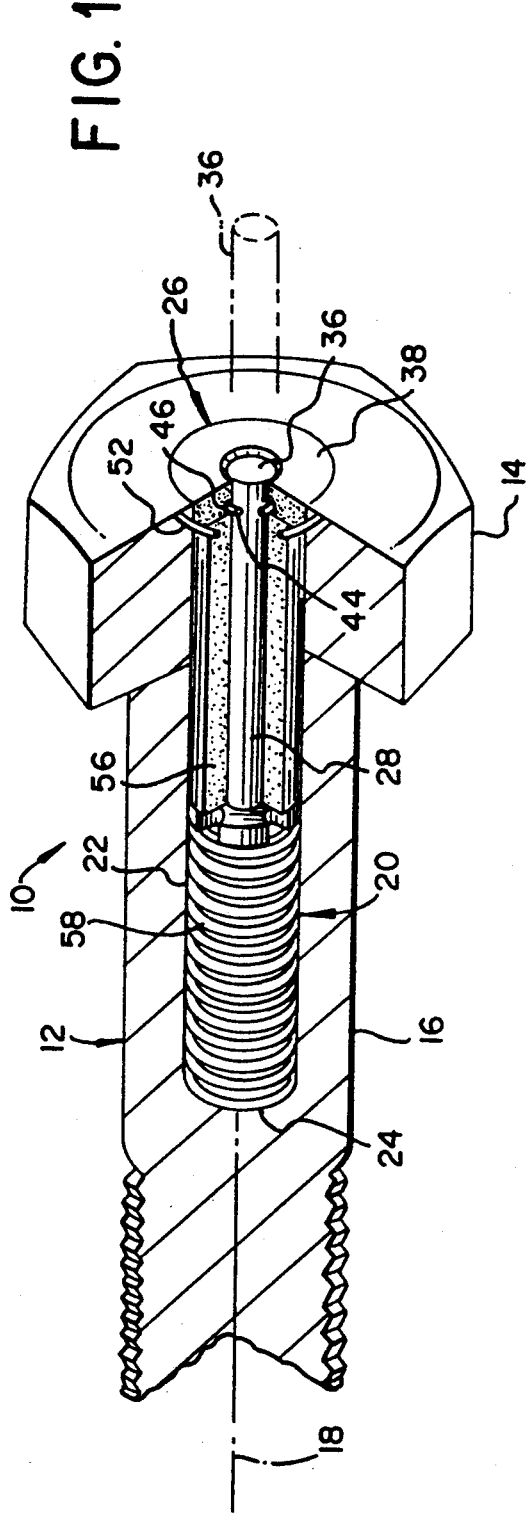
FIG. 1 is an elevational perspective view with a 90° section removed of a warning device according to the present invention.
Figure 2:
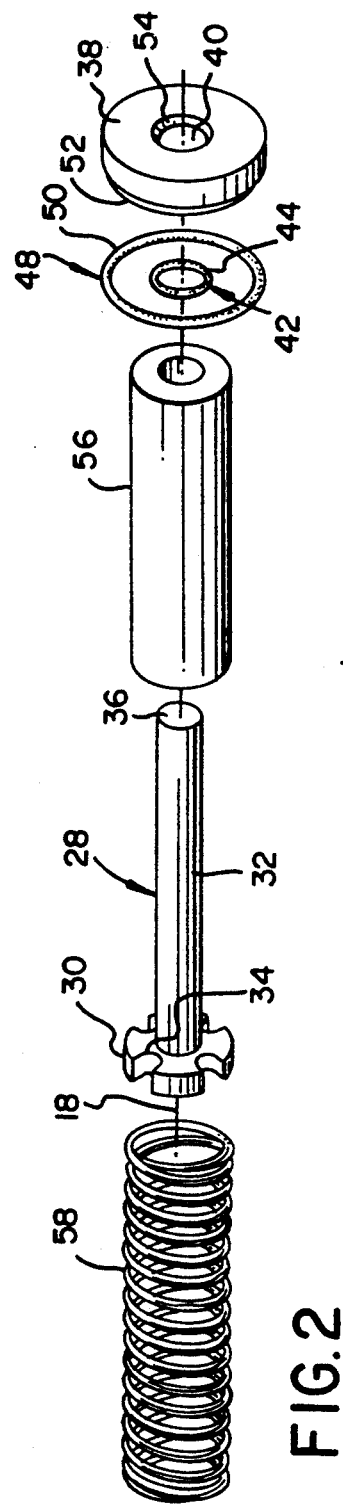
FIG. 2 is an exploded perspective view of the internal parts of the warning device depicted in FIG. 1.

With reference now to the drawings in which like numerals represent like elements throughout the views, a warning device 10 according to a preferred embodiment of the present invention is depicted in FIG. 1. Warning device 10 is designed to indicate when a threshold temperature has been exceeded. Warning device 10 includes a base body which in this embodiment is a threaded bolt 12 having a bolt head 14 and a bolt body 16 with the remainder of the threaded part not depicted for clarity. As shown, bolt body 16 extends along a longitudinal axis 18. Provided along longitudinal axis 18 in bolt head 14 and bolt body 16 is a longitudinal bore 20. Longitudinal bore 20 is defined by a surrounding surface 22, and longitudinal bore 20 has a closed end 24 in bolt body 16 and an open end 26 in bolt head 14.

Located in longitudinal bore 20 is a plunger 28. Plunger 28 includes a plunger head 30 and a plunger body 32. It will be appreciated that plunger head 30 substantially fills longitudinal bore 20 in the radial direction and that plunger head 30 has channels 34 longitudinally therethrough as shown. It will also be appreciated that plunger body 32 has a plunger end 36 which normally terminates at open end 26 of longitudinal bore 20, but plunger end 36 can be extended (in a manner to be described subsequently) beyond open end 26 as shown by the chained line.

A retaining means which is preferably a retaining cap 38 is secured in open end 26 of longitudinal bore 20. Retaining cap 38 includes a cap hole 40 through which plunger end 36 and plunger body 32 freely extend. In order to seal longitudinal bore 20 from outside weather, a first sealing means 42 in the form of a silicone rubber O ring 44 is provided between plunger body 32 and retaining cap 38. As shown, O ring 44 is located in a recess 46 provided at a corner of retaining cap 38 along cap hole 40 and distant from open end 26. In addition, a second sealing means 48 in the form of a silicone rubber O ring 50 is provided between bolt head 14 and retaining cap 38 in order to seal longitudinal bore 20. As shown, O ring 50 is located in a recess 52 provided at a corner of retaining cap 38 along the outer side thereof and distant from open end 26. Silicone rubber is used for both O rings 44 and 50 due to its satisfactory performance in high and low temperature environments.

Retaining cap 38 also includes a beveled surface 54 at the corner of retaining cap 38 along cap hole 40 and hence adjacent open end 26 as shown. Beveled surface 54 is machined at this corner to prevent any burrs which might be raised by objects impacting at this corner from impeding an outward movement of plunger body 16 (as explained subsequently).

In order to secure retaining cap 38 in longitudinal bore 20, retaining cap 38 is preferably formed to be force fit therein. However, to assure that retaining cap 38 does not accidentally come out of longitudinal bore 20, bolt head 14 is preferably rolled so that a small rolled edge (not shown) will be formed over the edge of longitudinal bore 20 to hold retaining cap 38 in place.

Warning device 10 also includes a sleeve 56 formed of a fusible material having a desired melting temperature. For example, sleeve 56 could be formed of fusible bismuth, lead and tin alloys well known to those of ordinary skill in the art and readily available commercially at predetermined melting temperatures. The particular alloy chosen would be the one with a melting temperature closest to the desired threshold temperature which warning device 10 is designed to indicate has been exceeded. Sleeve 56 is designed to substantially fill a volume of longitudinal bore 20 radially between plunger body 32 and surrounding surface 22 and longitudinally between plunger head 30 and retaining cap 38. A spring 58 is compressed in longitudinal bore 20 between closed end 24 and plunger head 30. Thus, it will be appreciated that spring 58 pushes against plunger head 30 and urges plunger body 32 outward of open end 26 of longitudinal bore 20, but this movement is ordinarily prevented by the presence of sleeve 56 which is thus under compression.

In operation, warning device 10 is used in the following manner. As an example, warning device 10 is conveniently used to indicate when a rolling bearing for a train wheel has exceeded some threshold temperature, such as 281° F. For a railroad wheel bearing, such a temperature is indicative of an approaching bearing failure, but this temperature is experienced some time prior to an actual failure (as well known to those in the art). Thus, warning device 10 in such a situation is used in place of one of (typically) three bolts which attach an end cap of the bearing to the axle hub. This positions warning device 10 in a metal-to-metal heat conduction path with the inner ring of the bearing so that the temperature of the bearing is approximately the same as that of warning device 10.

When a bearing is beginning to fail and it heats up, warning device 10 similarly heats up. Eventually, when the melting temperature (281° F., for example) of sleeve 56 is exceeded, the melted material of sleeve 56 is pumped back through channels 34 in plunger head 30 by the action of compressed spring 58. As this occurs, spring 58 also moves plunger 28 so that plunger end 36 and a significant portion of plunger body 32 extend beyond retaining cap 38 and are easily visible. It is thus a simple matter to periodically check along the length of the train for extended plunger bodies, and to schedule the associated bearings for repair or replacement.

With such a usage of warning device 10, it will be appreciated that warning device 10 is used in an extremely adverse environment. Therefore, other than sleeve 56 and O rings 44 and 50, the remainder of warning device 10 is preferably made of stainless steel so as to be corrosion resistant as well as being rugged, strong, and reliable. This corrosion resistance is also enhanced by the sealing of the interior with sealing means 42 and 48. Because of this construction, it will be appreciated that warning device 10 can be relied on to function properly even if left in place for long periods of time while being exposed to adverse environmental conditions.

It will also be appreciated that the materials of sleeve 56 are typically susceptible to cold flow in such an environment due to the pressure of spring 58, as well as due to the shock and vibration of the train environment. Thus, there is a distinct possibility that a fusible element used in such an environment will experience cold flow and additionally that it will be fragmented by such shocks or vibrations. However, the configuration of the present invention is such that it is fail-safe even if these things occur. In particular, even if cold flow does occur, this will be limited because sleeve 56 is located in a confined volume. Thus, cold flow will only serve to improve the heat transfer characteristics of the sleeve as it is deformed in the confined volume and thus better contacts the enclosing surfaces. Similarly, because sleeve 56 is confined, even if fragmentation does occur, there is nowhere for the fragments to go so that sleeve 56 continues to function (to prevent plunger body 16 from extending from bolt head 14 until sleeve 56 is melted).

Figure 3:
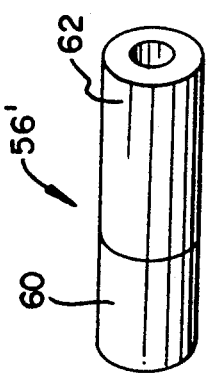
FIG. 3 is a perspective view of an alternative embodiment of a sleeve according to the present invention.

Depicted in FIG. 3 is an alternative embodiment of a sleeve 56' which can be used in place of sleeve 56 to form a two stage warning device. Sleeve 56' is formed of two discrete sleeve portions 60 and 62. Sleeve portion 60 is designed to abut against plunger head 30, and sleeve portion 60 is made from a fusible material with a lower melting point than that of sleeve portion 62. For example, the melting point of sleeve portion 60 could be 255° F. while that of sleeve portion 62 could be 281° F.

In use, sleeve 56' provides a two stage warning device. Thus, when the associated bearing reaches a temperature of 255° F., sleeve portion 60 melts allowing spring 58 to move into abutment with sleeve portion 62. In this position, a portion of plunger body 32 equal in length to sleeve 60 extends from bolt head 14. If the temperature subsequently increases to 281° F., sleeve portion 62 then melts and the remainder of plunger body 32 is extended from bolt head 14 by spring 58. Due to this two stage deployment of plunger body 32, it is thus possible to tell if the associated bearing has heated to the first temperature but has not yet reached the second, or if the bearing has reached the higher temperature. This information could be useful in deciding when a repair is necessary or a breakdown imminent.

Although preferred embodiments of a warning device according to the present invention have been described above, it will be appreciated that other embodiments are possible. For example other materials could be used and other configurations of the elements could be made. In addition, additional warning stages could be provided by providing additional sleeve portions, so long as the sleeve was constructed with the sleeve portions arranged in increasing melting temperature order from the plunger head. Thus, while the present invention has been described with respect to exemplary embodiments thereof, it will be understood by those of ordinary skill in the art that variations and modifications can be effected within the scope and spirit of the invention.

I claim:

1. A temperature warning device which indicates when a threshold temperature has been exceeded comprising:

a threaded bolt having a bolt head and a bolt body extending along a longitudinal axis from said bolt head, said bolt head and bolt body having a longitudinal bore defined by a surrounding surface provided along said longitudinal axis with said bore having a closed end and an open end at said bolt head;

a plunger in said bore having a plunger head and a plunger body of smaller longitudinal cross section than said plunger head, said plunger body extending from said plunger head and terminating at the open end of said bore;

a retaining cap secured in said bore of said bolt head having a cap hole through which said plunger body freely extends;

a sleeve of a fusible material contained in said bore which melts at the threshold temperature, said sleeve before melting substantially filling a volume of said bore radially between said plunger body and the surrounding surface of said bore and longitudinally between said plunger head and said cap so as to be confined in this volume; and a spring located in said bore and compressed before melting of said sleeve between said closed end and said plunger head so as to exert a force on said plunger head and hence a compressive force on said sleeve and such that if the threshold temperature is exceeded, said fusible sleeve melts and said spring moves said plunger longitudinally so that said plunger body extends beyond said retaining cap and said bolt head and is easily visible.

2. A warning device as claimed in claim 1 and further including a first seal means for sealing between said plunger body and said retaining cap while allowing relatively free movement of said plunger body and a second seal means for sealing between said retaining cap and said surrounding surface of said bore.

3. A warning device as claimed in claim 1 wherein said sleeve is formed of two discrete longitudinal portions butted end to end with a fusible material of said portion adjacent said plunger head having a lower melting temperature than a fusible material of the other said portion whereby upon reaching the melting temperature of said portion adjacent said plunger head said spring moves said plunger head into engagement with the other said portion and hence said plunger body extends partially beyond said bolt head and upon reaching the melting temperature of the other said portion said spring moves said plunger head further toward said bolt head and hence said plunger body extends further beyond said bolt head.

4. A warning device as claimed in claim 1 wherein said retaining cap includes a beveled surface at an outermost portion of said cap hole.

5. A warning device as claimed in claim 1 wherein said plunger head substantially fills said bore radially and includes channels longitudinally therein through which the fusible material of said sleeve passes when melted.

6. A warning device as claimed in claim 5 wherein said retaining cap includes a beveled surface at an outermost portion of said cap hole.

7. A warning device as claimed in claim 6 and further including a first seal means for sealing between said plunger body and said retaining cap while allowing relatively free movement of said plunger body and a second seal means for sealing between said retaining cap and said surrounding surface of said bore.

8. A warning device as claimed in claim 5 wherein said sleeve is formed of two discrete longitudinal portions butted end to end with a fusible material of said portion adjacent said plunger head having a lower melting temperature than the other said portion whereby upon reaching the melting temperature of said portion adjacent said plunger head said spring moves said plunger head into engagement with the other said portion and hence said plunger body extends partially beyond said bolt head and upon reaching the melting temperature of the other said portion said spring moves said plunger head further toward said bolt head and hence said plunger body extends further beyond said bolt head.

9. A temperature warning device which indicates when a threshold temperature has been exceeded by an object in heat conduction contact therewith comprising:
- an elongate base body having a longitudinal axis and a longitudinal bore defined by a surrounding surface provided along said longitudinal axis with said bore having a closed end and an open end;
- a plunger in said bore having a plunger head and a plunger body of smaller longitudinal cross section than said plunger head, said plunger body extending from said plunger head and terminating adjacent the open end of said bore;
- a retaining means in said bore of said main body adjacent said open end for closing said open end except for an end hole in said retaining means through which said plunger body movably extends;
- a sleeve of a fusible material contained in said bore which melts at the threshold temperature, said sleeve before melting substantially filling a volume of said bore radially between said plunger body and the surrounding surface of said bore and longitudinally between said plunger head and said retaining means; and
- a spring located in said bore and compressed before melting of said sleeve between said closed end and said plunger head such that is the threshold temperature is exceeded, said fusible sleeve melts and said spring moves said plunger longitudinally so that said plunger body extends beyond said retaining means and said bolt head and is easily visible.

10. A warning device as claimed in claim 9 and further including a first seal means for sealing between said plunger body and said retaining means while allowing relatively free movement of said plunger body and a second seal means for sealing between said retaining means and said surrounding surface of said bore.

11. A warning device as claimed in claim 9 wherein said sleeve is formed of two discrete longitudinal portions butted end to end with a fusible material of said portion adjacent said plunger head having a lower melting temperature than a fusible material of the other said portion whereby upon reaching the melting temperature of said portion adjacent said plunger head said spring moves said plunger head into engagement with the other said portion and hence said plunger body extends partially beyond said bolt head and upon reaching the melting temperature of the other said portion said spring moves said plunger head further toward said open end and hence said plunger body extends further beyond said open end.

12. A warning device as claimed in claim 9 wherein said retaining means includes a retaining cap having a beveled surface at an outermost portion of said end hole.

13. A warning device as claimed in claim 9 wherein said plunger head substantially fills said bore radially and includes channels longitudinally therein through which the fusible material of said sleeve passes when melted.

14. A warning device as claimed in claim 13 wherein said retaining means includes a beveled surface at an outermost portion of said end hole.

15. A warning device as claimed in claim 14 and further including a first seal means for sealing between said plunger body and said retaining means while allowing relatively free movement of said plunger body and a second seal means for sealing between said retaining means and said surrounding surface of said bore.

16. A warning device as claimed in claim 13 wherein said sleeve is formed of two discrete longitudinal portions butted end to end with a fusible material of said portion adjacent said plunger head having a lower melting temperature than the other said portion whereby upon reaching the melting temperature of said portion adjacent said plunger head said spring moves said plunger head into engagement with the other said portion and hence said plunger body extends partially beyond said open end and upon reaching the melting temperature of the other said portion said spring moves said plunger head further toward said open end and hence said plunger body extends further beyond said open end.

* * * * *